US010781123B2

(12) United States Patent
Major et al.

(10) Patent No.: US 10,781,123 B2
(45) Date of Patent: Sep. 22, 2020

(54) MULTI-STAGE WASTEWATER TREATMENT AND HYDROPONIC FARMING DEVICE (71) Applicant: NuLeaf Tech, Inc., Cupertino, CA (US)

(72) Inventors: Rachel Deette Major, Cupertino, CA (US); Ariel Thomas Garsh-Ochoa, Mountain View, CA (US); Nicole Ronnie Miller, Los Altos, CA (US); Christopher Emrys Venter, Brisbane, CA (US)

(73) Assignee: NuLeaf Tech, Inc., Cupertino, CA (US)

(*) Notice: Subject to any disclaimer, the term of this patent is extended or adjusted under 35 U.S.C. 154(b) by 0 days.

(21) Appl. No.: 16/057,597

(22) Filed: Aug. 7, 2018

(65) Prior Publication Data

US 2019/0039931 A1    Feb. 7, 2019

Related U.S. Application Data

(60) Provisional application No. 62/542,101, filed on Aug. 7, 2017.

(51) Int. Cl.
*C02F 9/00* (2006.01)
*C02F 3/28* (2006.01)
(Continued)

(52) U.S. Cl.
CPC ............... *C02F 9/00* (2013.01); *A01G 31/02* (2013.01); *C02F 3/2866* (2013.01); *C02F 3/005* (2013.01);
(Continued)

(58) Field of Classification Search
CPC .......... C02F 9/00; C02F 3/2866; C02F 3/005; C02F 2201/009; C02F 3/32; C02F 2303/10; C02F 3/22; C02F 3/085; A01G 31/02
(Continued)

(56) References Cited

U.S. PATENT DOCUMENTS

4,255,896 A * 3/1981 Carl ..................... A01G 31/06
                                                        47/62 C
5,067,275 A * 11/1991 Constance ............ A01G 31/02
                                                        47/59 R
(Continued)

*Primary Examiner* — Fred Prince
(74) *Attorney, Agent, or Firm* — Adibi IP Group, PC; Amir V. Adibi; Andrew C. Palmer (57) ABSTRACT

A Multi-Stage Wastewater Treatment and Hydroponic Farming Device comprises a compact basin, a moving bed biofilm reactor (MBBR), a modified wetland material, at least one microbial fuel cell (MFC) and a distributor. The MBBR and modified wetland material are disposed within the basin. Openings in the distributor retain hydroponic plants. In one example, wastewater enters through the MBBR which performs primary treatment of wastewater. Treated wastewater is further treated by modified wetland material and the MFC which generates electrical energy that supplies other components. Treated wastewater is pumped through the distributor and processed by hydroponic plants which extract growth inducing nutrients from the treated wastewater. Resultant water treated by the device is selectively recycled through various parts of the device or extracted from the device and used for other purposes. In one example, multiple devices are deployed in an area thereby providing self-sustaining, efficient water treatment and farming functionality.

18 Claims, 12 Drawing Sheets

A TOP CORNER PERSPECTIVE VIEW OF THE MULTI-STAGE WASTEWATER AND HYDROPONIC FARMING DEVICE (51) Int. Cl.
  *A01G 31/02*   (2006.01)
  *C02F 3/00*   (2006.01)
  *C02F 3/08*   (2006.01)
  *C02F 3/22*   (2006.01)
  *C02F 3/32*   (2006.01)

(52) U.S. Cl.
  CPC ............... *C02F 3/085* (2013.01); *C02F 3/22* (2013.01); *C02F 3/32* (2013.01); *C02F 2201/009* (2013.01); *C02F 2303/10* (2013.01)

(58) Field of Classification Search
  USPC ....... 210/602, 615, 616, 617, 620, 150, 151; 47/62 R
  See application file for complete search history.

(56) References Cited

U.S. PATENT DOCUMENTS

| | | | | |
|---|---|---|---|---|
| 6,574,917 B2 * | 6/2003 | Boxsell | ................. | A01G 31/02 |
| | | | | 47/62 C |
| 2015/0305313 A1 * | 10/2015 | Licamele | ............... | A01K 63/04 |
| | | | | 119/204 |
| 2016/0037738 A1 * | 2/2016 | Kato | ..................... | A01G 31/02 |
| | | | | 47/62 R |
| 2016/0050863 A1 * | 2/2016 | Graber | .................. | A01G 31/02 |
| | | | | 47/62 R |
| 2017/0055473 A1 * | 3/2017 | Baker | ..................... | A01G 9/025 |
| 2018/0295799 A1 * | 10/2018 | Wilton | .................. | A01G 9/023 |
| 2019/0183033 A1 * | 6/2019 | Glaude | ............... | A01B 79/005 |

\* cited by examiner

A TOP CORNER PERSPECTIVE VIEW OF THE MULTI-STAGE
WASTEWATER AND HYDROPONIC FARMING DEVICE

FIG. 1

A TOP CORNER PERSPECTIVE VIEW OF A SIMPLIFIED VERSION OF THE MULTI-STAGE WASTEWATER AND HYDROPONIC FARMING DEVICE

FIG. 2

A CROSS-SECTIONAL VIEW OF THE
MOVING BED BIOFILM REACTOR (MBBR)

FIG. 3

A CROSS-SECTIONAL VIEW OF THE MODIFIED
WETLAND MATERIAL

FIG. 4

A CROSS-SECTIONAL VIEW OF ONE EMBODIMENT OF A MICROBIAL FUEL CELL (MFC)

FIG. 5

A BOTTOM CORNER PERSPECTIVE VIEW OF A SIMPLIFIED
VERSION OF THE MULTI-STAGE WASTEWATER AND
HYDROPONIC FARMING DEVICE

FIG. 6

A FRONT VIEW OF THE SIMPLIFIED VERSION OF THE MULTI-STAGE WASTEWATER AND HYDROPONIC FARMING DEVICE

FIG. 7

A RIGHT VIEW OF THE SIMPLIFIED VERSION OF THE MULTI-STAGE WASTEWATER AND HYDROPONIC FARMING DEVICE

FIG. 8

A TOP VIEW OF THE SIMPLIFIED VERSION OF THE MULTI-STAGE WASTEWATER AND HYDROPONIC FARMING DEVICE

FIG. 9

FRONT VIEW OF THE MULTI-STAGE WASTEWATER AND
HYDROPONIC FARMING DEVICE

FIG. 10

A FRONT VIEW OF OPERATION OF THE MULTI-STAGE WASTEWATER AND HYDROPONIC FARMING DEVICE

FIG. 11

A PERSPECTIVE VIEW OF MULTIPLE MULTI-STAGE WASTEWATER AND HYDROPONIC FARMING DEVICES

MULTI-STAGE WASTEWATER TREATMENT AND HYDROPONIC FARMING DEVICE

CROSS-REFERENCE TO RELATED APPLICATIONS

This application claims the benefit under 35 U.S.C. § 119 of U.S. provisional patent application Ser. No. 62/542,101, entitled "Combined Engineered Wetlands and Microbial Fuel Cells for Wastewater Treatment Device," filed on Aug. 7, 2017. The subject matter of U.S. provisional patent application Ser. No. 62/542,101 is incorporated herein by reference.

TECHNICAL FIELD

The present invention relates generally to wastewater treatment and hydroponic farming devices.

BACKGROUND INFORMATION

Environmental pollution is an ever-increasing concern. Waste is being produced at all-time high rates, and the energy and materials devoted to creating items that ultimately end up in landfills are not being utilized at a sustainable rate. Simultaneously, clean water resources are depleting at an alarming rate, leading many economists to believe that clean water will soon become more valuable than oil. Energy and water intensive practices and products have resulted in a national and global water and energy crisis that only the ingenuity of engineers and developers can solve.

To this end, a variety of clean energy technologies have been created and implemented, at various scales. Solar cells, hydroelectric dams, windmills, geothermal pump systems, and more solutions harness naturally-occurring energy sources that would otherwise go to waste. Many of these systems, however, rely on converting mechanical or thermal energy into inductive charging of a battery, and thus rely on a large number of moving parts. Such mechanical motion results in a large amount of required regular maintenance due to cyclical degradation of components, which increases their cost and resource demands and thus reduces their overall cost efficiency. Solar cells do not rely on moving parts, but have a large, prohibitive manufacturing cost and large resource and labor costs, and are thus similarly impractical for solving energy demand issues.

Similarly, many water purification systems are also either too expensive or resource-intensive to implement on a small scale. For example, large-scale engineered wetlands have a fair amount of promise, as they rely on naturally-occurring processes to remove impurities from water. Currently, however, when modifying the wetlands to a small-scale operation challenges arise that need to be overcome in order to produce effective wastewater treatment similar to that of a large-scale engineered wetlands. Additionally, engineered wetlands have a more difficult time treating effluent that has not been primarily treated. Microbial Fuel Cell technology is capable of cleaning wastewater and generating electricity. No device is known that integrates a Microbial Fuel Cell with an engineered wetland on a small-scale. A solution that overcomes these challenges is desired.

SUMMARY

A Multi-Stage Wastewater Treatment and Hydroponic Farming Device is a self-contained, self-sustaining, ecofriendly modular unit that provides three stages of water treatment as well as hydroponic farming on a small-scale. The device has an environmentally friendly design that can be used both in indoor and outdoor settings. The device is also relatively compact while providing powerful wastewater treatment at a size and price point that is previously unprecedented.

The combination of a Moving Bed Biofilm Reactor (MBBR), modified wetlands, and Microbial Fuel Cells (MFCs) create a treatment device that enables conversion of contaminated water into clean, particulate-free water, and simultaneously creates liquid fertilizer and collects and stores charge from ionized particles, resulting in electrical energy generation.

The MBBR provides primary treatment of wastewater. The modified wetlands provide some primary treatment but mostly secondary and tertiary treatment of wastewater. The MFCs provide tertiary treatment of wastewater. In addition to treating the wastewater, the MFC(s) generate electricity which can be stored and used to provide power to the device. The multi-stage wastewater treatment and hydroponic farming device also grows plants, such as microgreens, which provide tertiary treatment to the wastewater and can be harvested by the user.

The Multi-Stage Wastewater Treatment and Hydroponic Farming Device can easily be combined with other multi-stage wastewater treatment and hydroponic farming devices. The basin can be fabricated from wood or other ecofriendly material, thereby reducing the carbon footprint that the device has on the environment.

The primary tube of the distributor of the device can designed in various shapes and sizes serves as an area for plant cultivation.

The MBBR allows bacteria from the wastewater to grow on carrier material (e.g. plastic carriers). The bacteria then breakdown organic matter from the wastewater. The MBBR provides high-volume primary wastewater treatment that economical, compact, and requires little maintenance.

The modified wetland material is comprised of controlled natural growth similar to that found in naturally-occurring wetlands that enables removal of larger contaminant particles from water as well as waste dissolved in the water. The modified wetland material is also capable of removing heavy metals and other charged particles often existing in dirty water resulting from manufacturing processes and the like. The natural processes of the modified wetland material further treat the wastewater coming from the MBBR or the MFC(s). The modified wetland material takes up most of the basin and is integrated with the MFC(s) to allow for simultaneous water purification and energy generation.

The Multi-Stage Wastewater Treatment and Hydroponic Farming Device utilizes modified wetlands to remove solid waste and break down complex soluble waste from dirty water. The MFC(s) assist in further breaking down the soluble waste in the now less dirty water while capturing charge that can be sent to charge a battery for storage. Water is thusly cleaned of large contaminants and contaminants dissolved in the water, both of which are converted into and utilized as liquid fertilizer. The nutrient-rich water is used to feed both the wetland plants and the series of hydroponic plants, resulting in further filtration of water. However, it should be noted that the water containing liquid fertilizer can be used as the user sees fit and does not have to be passed through an additional layer of plants. The clean water resulting from this process is collected for external use.

In the preferred usage of the Multi-Stage Wastewater Treatment and Hydroponic Farming Device, the user acquires the modified wetland material and the MFCs. The user places the hydroponic plants within the plurality of plant retaining holes of the primary tube. Additional preparations to the modified wetland material may also be necessary. The user subsequently turns on the pump. Once activated, the user adds wastewater to be cleaned to the basin. The wastewater flows through the MBBR, the MFCs, and the modified wetland layer, resulting in cleaner water, electricity, and the generation of treated wastewater (liquid fertilizer). The treated wastewater then travels up the trunk and down the primary tube. Gravity sends the treated wastewater along the primary tube to each plant, which removes nutrients and excess particulates from the treated wastewater to further clean the water. The resultant water is then collected for subsequent use. The Multi-Stage Wastewater Treatment and Hydroponic Farming Device is prepared for subsequent use.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings. All illustrations of the drawings are for the purpose of describing selected versions of the present invention and are not intended to limit the scope of the present invention.

Figure 1:
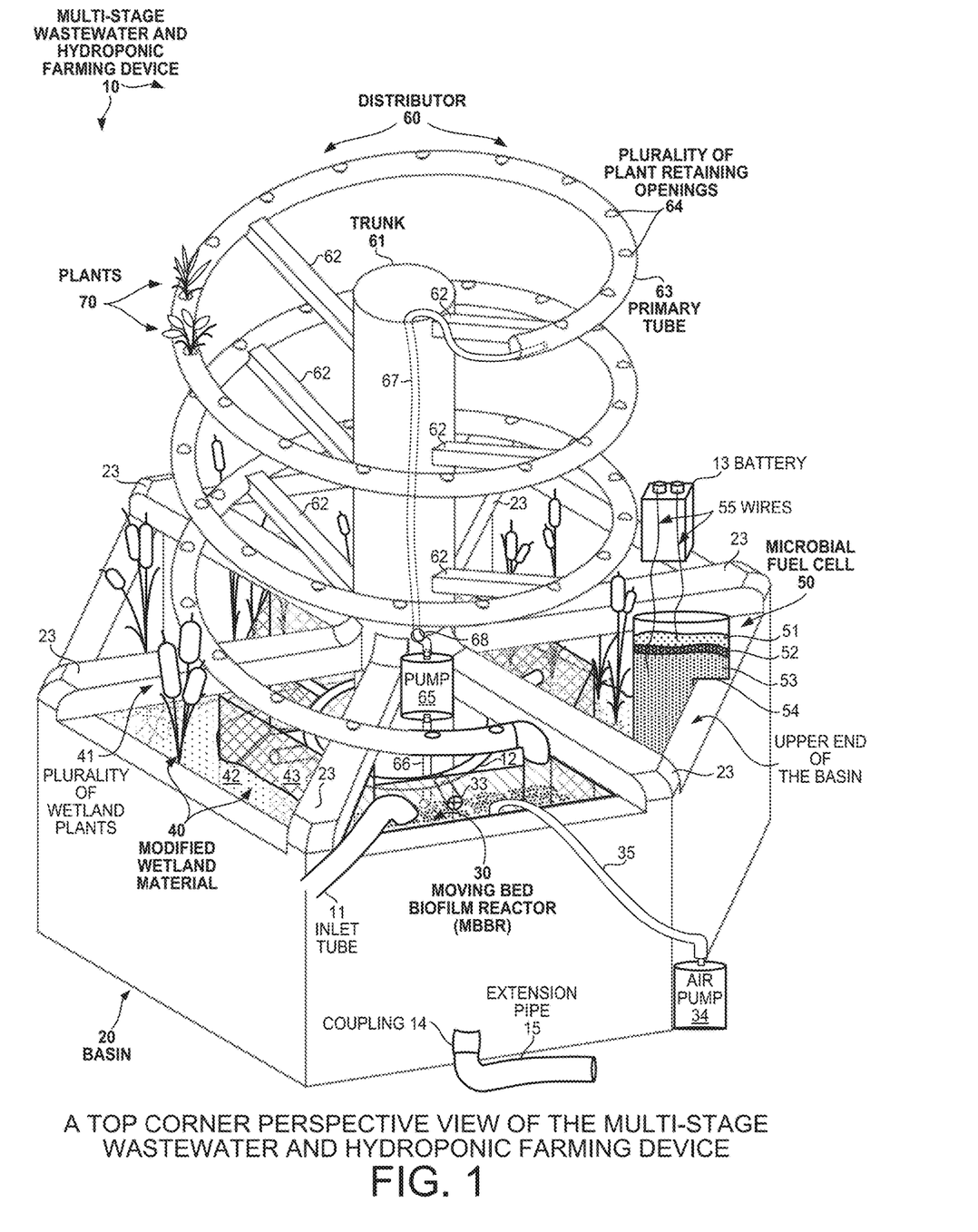
FIG. 1 is a diagram showing a top corner perspective view of the Multi-Stage Wastewater Treatment and Hydroponic Farming Device.

FIG. 1 is a diagram showing a top corner perspective view of the Multi-Stage Wastewater Treatment and Hydroponic Farming Device 10 in accordance with one embodiment. The Multi-Stage Wastewater Treatment and Hydroponic Farming Device 10 comprises a basin 20 and a distributor 60. In one example, water is supplied to and extracted from the Multi-Stage Wastewater Treatment and Hydroponic Farming Device 10 using an inlet tube 11, a coupling 14 and extension pipe 15. The inlet tube 11 is a hollow, preferably PVC or another plastic connector that enables a user to continuously add wastewater 80 to the basin 20. The inlet tube 11 can vary in length based on the user's needs. In another example, the Multi-Stage Wastewater Treatment and Hydroponic Farming Device 10 does not include the inlet tube 11, allowing the user to add wastewater 80 to the basin 20 in batches.

The basin 20 comprises modular sections that form a container that enables capture and containment of wastewater 80, treated wastewater 81, and resultant water 82. In this example, the basin 20 contains an irrigation pipe 12, a battery 13, a water containment interior layer (not shown, see FIG. 2), a Moving Bed Biofilm Reactor (MBBR) 30, a modified wetland material 40, at least one Microbial Fuel Cell (MFC) 50, the distributor 60, and a plurality of supports 23 that provide structural support to the distributor 60. The plurality of supports 23 is a set of rigid, solid extensions that extend from the basin 20 to the distributor 60 that support the distributor 60. In another example, some of the plurality of supports 23 are hollow and used as outlet pipes. In another example, the basin 20 does not require the plurality of supports 23 to support the distributor 60.

In accordance with at least one novel aspect, the Multi-Stage Wastewater Treatment and Hydroponic Farming Device 10 has a compact state and an assembled state. The assembled state is shown in FIG. 1. In the compact state, the basin 20 is a stack of tightly packed sections and the distributor 60 is a collection of curved pipes that are attachable to each other. The tightly packed sections and the curved pipes are inserted into a container. The container is used for shipment and storage of the Multi-Stage Wastewater Treatment and Hydroponic Farming Device 10 when in the compact state. The Multi-Stage Wastewater Treatment and Hydroponic Farming Device 10 has a compact state provides compact packaging, shipping, transport and storage.

The irrigation pipe 12 transports treated wastewater 81 from the MBBR 30 to other areas of the basin 20. In this example, the irrigation pipe 12 is a circular shape with a plurality of extensions wherein each of the plurality of extensions has an opening. The example shown in FIG. 1 has four of the plurality of extensions, wherein one of the plurality of extensions is connected to a hole 33 disposed on one side of the MBBR 30. Additionally, three of the plurality of openings of the irrigation pipe 12 are adjacent to and face towards the outer area of the basin 20 containing the modified wetland material 40. In another example, the irrigation pipe 12 is a different shape and has a different number of plurality of openings such that at least one of the plurality of openings face the center of the basin 20. In yet another example, the irrigation pipe 12 is not included in the Multi-Stage Wastewater Treatment and Hydroponic Farming Device 10.

The distributor 60 enables transfer of treated wastewater 81 from the basin 20 to a primary tube 63. The distributor 60 comprises a trunk 61, the primary tube 63 having a top end, a bottom end, and a plurality of plant retaining openings 64, a pump 65, a plurality of secondary tubes (66 "capture tube" and 67 "trunk tube"), and a plurality of supports 62 that provide structural support to the primary tube 63.

The trunk 61 has an upper end and a lower end and is a hollow, rigid tube affixed to the basin 20 that enables transfer of treated wastewater 81 from the basin 20 to the top end of the primary tube 63.

The plurality of supports 62 is a set of rigid, solid tubular extrusions extending along the trunk 61 to the primary tube 63.

Figure 2:
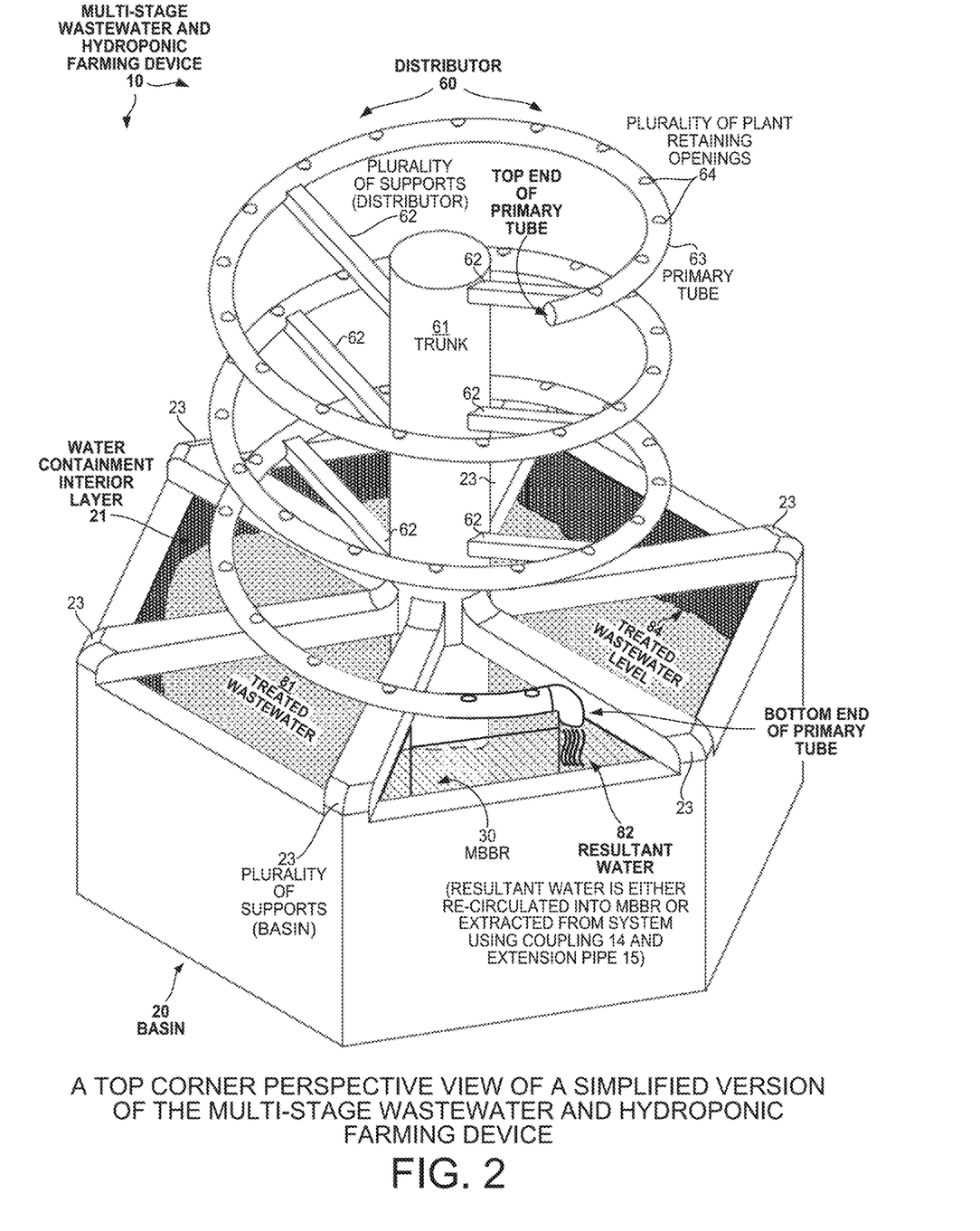
FIG. 2 is a diagram showing a top corner perspective view of a simplified version of the Multi-Stage Wastewater Treatment and Hydroponic Farming Device.

The primary tube 63 is a hollow tubular segment that enables subsequent filtration of treated wastewater 81 through plant roots to create cleaner resultant water 82 (shown in FIG. 2). In one embodiment, the primary tube 63 is fed treated wastewater 81 that can then be used to grow plants. The primary tube 63 is in a helical shape circling the trunk 61 and is supported by the plurality of supports 62 of the distributor 60. In one embodiment the primary tube 63 is a single unitary structure that is formed from a single tube of plastic. In another embodiment primary tube 63 is comprised of a plurality of segments that are connected together to form the tube shown in FIG. 1. In another embodiment, the primary tube 63 extends beyond the outer perimeter of the basin 20. In yet another embodiment, the primary tube 63 is a different shape. In yet another embodiment, there is a plurality of primary tubes that are included in the distributor 60.

The plurality of plant retaining openings 64 is a set of generally circular cuts into the primary tube 63. At least one of the plant retaining openings 64 comprises a plant 70. The plant 70 is any of a variety of plants that can utilize nutrients provided from the distributor 60 and subsequently filter further purify the treated wastewater 81 in the process. The spiral arrangement of the primary tube 63 allows each plant 70 in the plurality of plant retaining openings 64 to receive adequate sunlight as well as adequate water and nutrients and ensures that treated wastewater 81 and resultant water 82 will fall due to gravity through the primary tube 63. In one embodiment, the primary tube 63 is used to provide resources for growing plants and further cleaning the treated wastewater 81. In addition, it is possible for the user to use water treated from the combination of the MBBR 30, the modified wetland material 40, and the at least one MFC 50 directly as the user sees fit.

The pump 65 supplies treated wastewater 81 from the bottom of the basin 20, through the plurality of secondary tubes, and to the top end of the primary tube 63. The pump 65 is any of a variety of liquid pumps capable of pumping fluid. In this example, the pump 65 is affixed to the trunk 61 using suction cups. In another example, the pump 65 may be attached to the trunk 61 by a different attachment mechanism. In yet another example, where the basin includes the plurality of supports 23, the pump 65 rests on one of the plurality of supports 23 of the basin 20.

The capture tube 66 is one of the plurality of secondary tubes which enables the transfer of treated wastewater 81 from the basin 20 to the pump 65. The capture tube 66 has varying lengths and is made of plastic or other material. The capture tube 66 has an upper end and a lower end where the upper end of the capture tube 66 is connected to an inlet connector on the pump 65 and the lower end of the capture tube 66 is disposed below a treated wastewater level 84 of treated wastewater 81 contained in the basin 20 during operation.

The trunk tube 67 is one of the plurality of secondary tubes which enables the transfer of treated wastewater 81 from the pump 65 to the top end of the primary tube 63. The trunk tube 67 is made of plastic or other material. The trunk tube 67 has an upper end and a lower end where the lower end of the trunk tube is connected to an outlet connector on the pump 65 and the upper end of the trunk tube 67 is disposed within a portion of the top end of primary tube 63. In another example, the pump 65 has multiple inlet and outlet connectors and additional secondary tubes that connect to the primary tube 63. In yet another example, the pump 65 has multiple inlet and outlet connectors and additional secondary tubes that connect to a plurality of primary tubes.

Furthermore, in this example, the lower end of the trunk 61 contains a hole 68 that is larger than the outer diameter of the trunk tube 66. The upper end of the trunk tube 67 is threaded through the hole 68 and then through the opening in the upper end of the trunk 61 and is placed in the top end of the primary tube 63. In another example, the trunk 61 does not contain the hole 68 and the trunk tube 67 is disposed along the outside of the trunk 61.

Figure 3:
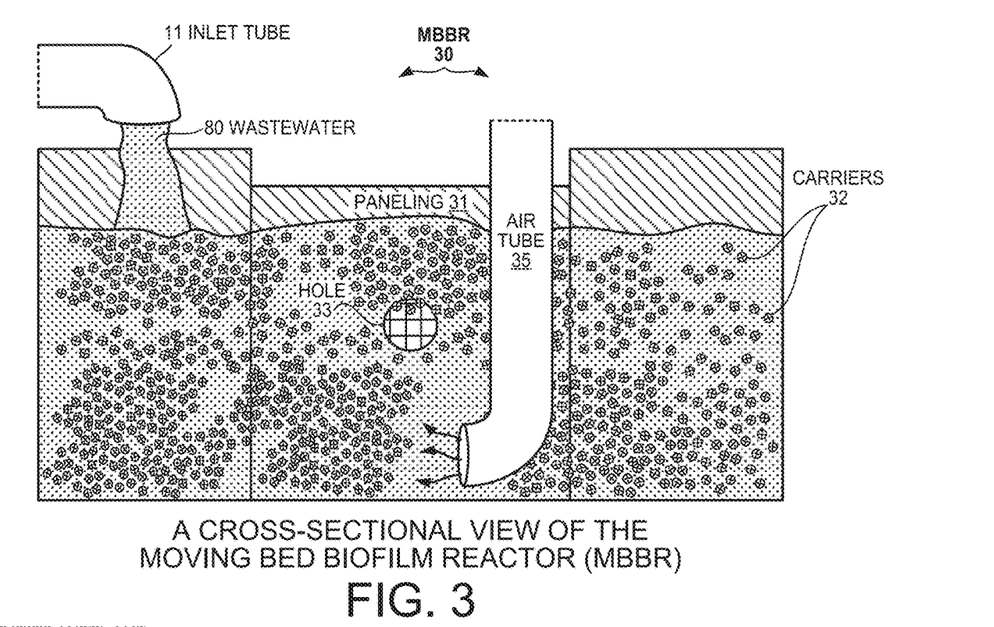
FIG. 3 is a cross-sectional view of the Moving Bed Biofilm Reactor (MBBR).

The MBBR 30 is contained within the basin 20 and provides primary treatment of the wastewater 80 (see FIG. 3). The MBBR 30 is surrounded from the sides and bottom by paneling 31 and includes a plurality of carriers 32. In one example, the MBBR 30 includes an air pump 34 and an air tube 35 to provide more oxygen to bacteria that clean the incoming wastewater 80 (primary treatment) and provides more circulation to the MBBR 30.

In this example, the paneling 31 is comprises an acrylic material. In another example, the MBBR 30 is enclosed by a different type of material. One of the sections of paneling 31 is lower in height than the other sections and contains a hole 33 that is covered in a wire-mesh type material that prevent the plurality of carriers 32 from exiting the MBBR 30. The hole 33 is connected to one of the plurality of openings of the irrigation pipe 12. In yet another example, wherein there is no irrigation pipe 12, the paneling 31 does not contain a hole 33, but rather the MBBR 30 has a wire-mesh ceiling that prevents the plurality of carriers 32 from exiting the MBBR 30. Here, the treated wastewater 81 flows over the one lower section of paneling 31 of the MBBR 30 into the remaining area of the basin 20.

The modified wetland material 40 provides some primary but mostly a combination of secondary and tertiary treatment of the treated wastewater 81. The modified wetland material 40 is disposed within an area of the basin 20. The modified wetland material 40 includes a plurality of wetland plants 41 having roots and a filter bed 42 (see FIG. 4). In this example, a wire-mesh type screening 43 provides support to the plurality of wetland plants 41.

The at least one MFC 50 provides tertiary treatment of the treated wastewater 81 by utilizing anaerobic digestion to cleanse the wastewater as well as convert chemical energy to electrical energy by the use of microorganisms. The at least one MFC 50 generates electricity that is transferred through a set of wires 55 to the battery 13. In this example, the at least one MFC 50 is disposed on an upper end of the basin and includes a container 54 that contains a plurality of layers that include a cathode layer 51, a proton exchange membrane 52, an anode layer 53. In another example, the at least one MFC 50 does not include a proton exchange membrane 52.

The anode layer 53 is a segment of the at least one MFC 50 that requires contact with the treated wastewater 81. One example of this is shown in FIG. 1 where the container 54 of the at least one MFC 50 is designed to rest on the upper end of the basin 20. A portion of the at least one MFC 50 containing the anode layer 53 is disposed below the treated wastewater level 84 during operation (see FIGS. 1 and 2). In another example, the container 54 has a different shape that can rest on either the plurality of supports 23 or the upper side of the basin 20 (see FIG. 5). In this example, the at least one MFC 50 would include a plurality of wicks 56 each having an upper end and a lower end, wherein with the upper end of each wick being contained in the anode layer 53 and the lower end of each wick being disposed below the treated wastewater level 84 during operation (see FIG. 5). In yet another example, the container 54 of the at least MFC 50 is comprises a different shape made of buoyant material that allows the container 54 to float on the treated wastewater level 84 (during operation). In yet another example, the container 54 has a different shape and attachments that can affix to the lower end of one of the plurality of supports 23. Further details regarding wastewater treatment by the at least one MFC 50 are described in FIG. 5 below.

Plants 70 provide tertiary cleaning of the treated wastewater 81. The plants 70 obtain nutrients from the treated wastewater 81 that flows through the primary tube 63 (tertiary treatment). The natural process of the plants 70 convert the treated wastewater 81 into resultant water 82. The plants 70 can be harvested and replaced. In this example, the plants 70 are a hydroponic type plant (e.g. microgreens).

The coupling 14 and extension pipe 15 allow the user to extract resultant water 82 from the Multi-Stage Wastewater Treatment and Hydroponic Farming Device 10. The user attaches the extension pipe 15 to the bottom end of the primary tube 63 using the coupling 14. The extension pipe 15 can vary in length based on the user's needs.

FIG. 2 is a diagram showing a top corner perspective view of a simplified version of the Multi-Stage Wastewater Treatment and Hydroponic Farming Device 10. Specifically, the Multi-Stage Wastewater Treatment and Hydroponic Farming Device 10 in FIG. 2 shows the basin 20, the water containment interior layer 21, the MBBR 30 (without the plurality of carriers 32 or hole 33), the distributor 60, and the primary tube 63 having the top end, bottom end, and the plurality of plant retaining openings 64. The water containment interior 21 comprises a waterproof, non-water permeable material that is capable of containing wastewater, other liquids, and solids. The distributor 60 shown includes the trunk 61 and the plurality of supports 62, that support the primary tube 63. The basin 20 shown includes the plurality of supports 23 that support the trunk 61 of the distributor 60.

Additionally, FIG. 2 shows an example of the treated wastewater level 84 during operation of the Multi-Stage Wastewater Treatment and Hydroponic Farming Device 10. Initially, the basin 20 will contain no wastewater. The treated wastewater level 84 may vary based on the height of the basin 20 and the desired amount of wastewater to be treated.

FIG. 3 is a cross-sectional view of the Moving Bed Biofilm Reactor (MBBR). In this example, wastewater 80 enters the MBBR 30 via the inlet tube 11. This example also shows sections of the acrylic paneling 31 that enclose the sides of the MBBR 30. The plurality of carriers 32 are circulated within the MBBR 30. Bacteria that grow on each of the plurality of carriers 32 breakdown organic matter from the wastewater 80 (primary treatment). In one example, the MBBR 30 includes the air tube 35 that conducts air from the air pump 34 which provides oxygen to the bacteria and more circulation to the MBBR 30. One of the sections of the paneling 31 of the MBBR 30 has a lower height than the other sides and contains a hole 33 where the treated wastewater 81 exits into the irrigation pipe 12 (see FIG. 1). The hole 33 is covered in a wire-mesh material that prevents the plurality of carriers 32 from exiting the MBBR 30.

In another embodiment, the section of the paneling 31 having the lower height does not contain the hole 33 such as in the example of FIG. 2. In this case, the treated wastewater 81, will overflow over the top of the section of the paneling 31 having the lower height and enter into the remaining area of the basin 20. A layer of wire-mesh material is needed to cover the MBBR 30, preventing the plurality of carriers 32 from escaping the MBBR 30.

Figure 4:
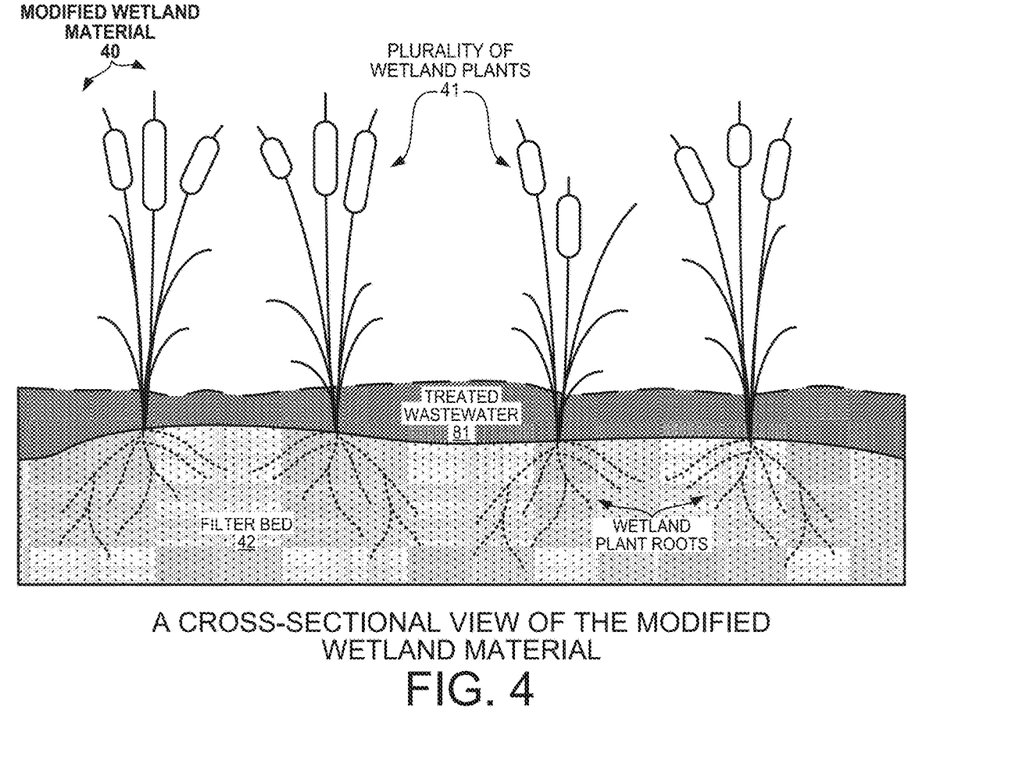
FIG. 4 is a cross-sectional view of the modified wetland material.

FIG. 4 is a cross-sectional view of the modified wetland material. The modified wetland material 40 comprises the plurality of wetland plants 41 and the filter bed 42. The plurality of the wetland plants 41 is rooted in the filter bed 42. Microbes located on roots of the wetland plants 41 provide secondary treatment of the treated wastewater 81. The microbes transform an amount of treated wastewater 81 into nutrients for the plurality of wetland plants 41 to eat and remove from the treated wastewater 81 (tertiary treatment). In this example, the plurality of wetland plants 41 include Macrophytes and Typha *Latifolia* and the filter bed 42 comprises a mixture of equal parts of silt, sand, and gravel (see FIG. 4). In another example, the plurality of wetland plants 41 includes different types of wetland plants and the filter bed 42 comprises a different mixture of wetland plant supporting material.

Figure 5:
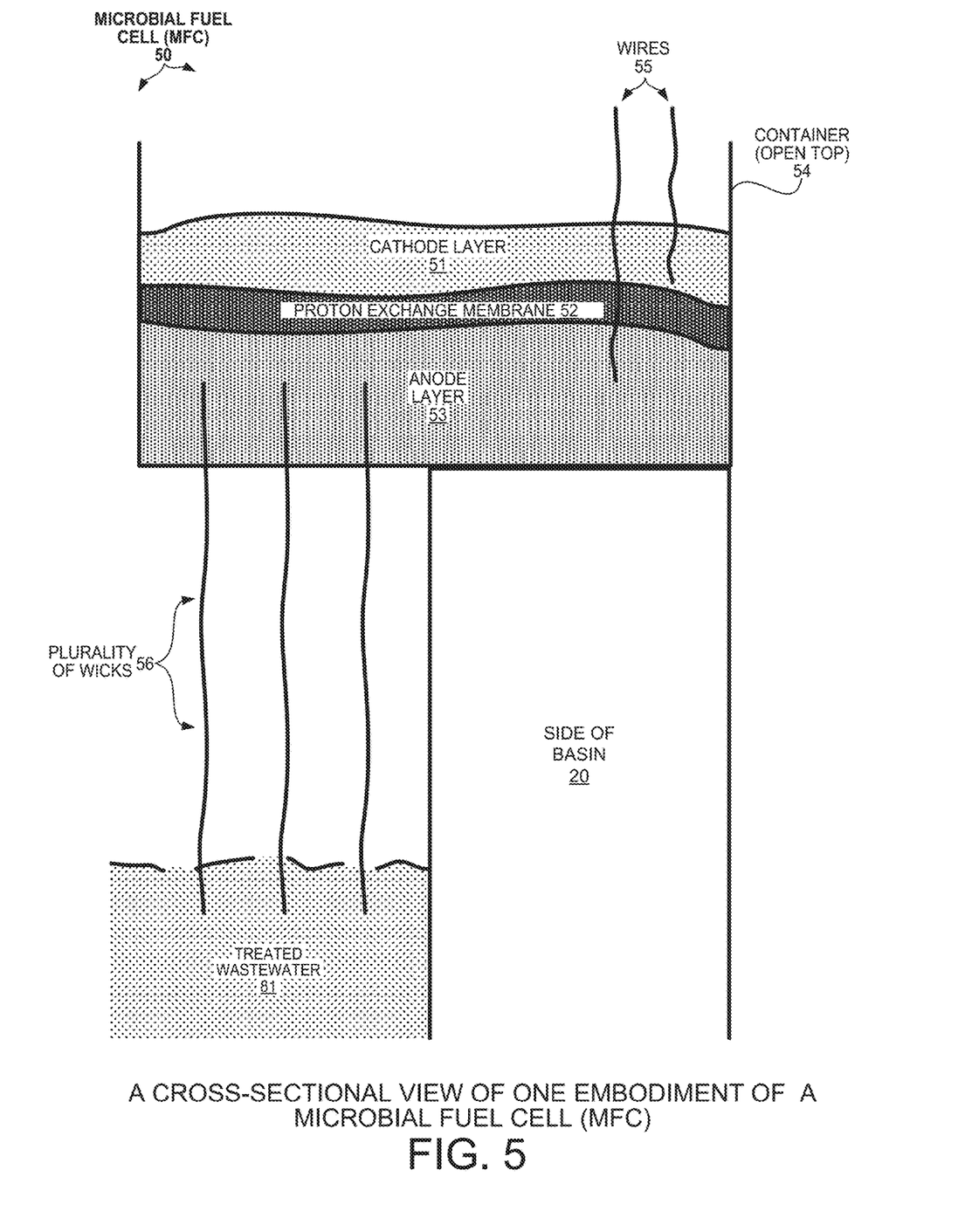
FIG. 5 is a cross-sectional view of one embodiment of a Microbial Fuel Cell (MFC).

FIG. 5 is a cross-sectional view of one embodiment of a Microbial Fuel Cell (MFC). The at least one MFC 50 is a device capable of breaking down organic waste and separating and recombining charged particles (tertiary treatment). In this example, the at least one MFC 50 is disposed on an upper end of the basin 20 and includes a container with an open top 54 that contains a plurality of layers that include a cathode layer 51, a proton exchange membrane 52, an anode layer 53, the set of wires 55, and the plurality of wicks 56. In another example, the at least one MFC 50 does not include a proton exchange membrane 52. In this example, the plurality of layers is a set of various metals, plastics, and ceramics that enables separation of charge from particles passing through and later recombining with charged particles in other layers.

The cathode and anode layers contain electrodes that connect to the battery 13 via the set of wires 55 (see FIG. 1). The battery 13 is any of a variety of electrical storage attached to the cathode layer 51 and the anode layer 53, enabling storage of electrical energy resulting from charged particles passing through the at least one MFC 50. The battery 13 is used to provide electricity to the pump 65 such that the pump 65 does not require another source of electricity. In addition, the battery 13 is also used to supply the air pump 34.

The cathode layer 51 is a segment of the at least one MFC 50 that requires oxygen and acts as a catalyst for chemical reactions that result in a mixture of positive and negative charged particles. Positively charged particles pass through the proton exchange membrane 52 to create a proton gradient. The cathode layer includes a wire mesh layer in a grid pattern that holds mud away from the proton exchange membrane layer 52.

The proton exchange membrane 52 is a layer separating the cathode layer 51 from the anode layer 53 and facilitates the passing of protons into the anode layer 53. In one embodiment, the proton exchange membrane 52 is made of nafion. It is to be understood that a variety of materials may be utilized to separate the cathode layer 51 from the anode layer 53. In other examples, an MFC is selected that does not have a proton exchange membrane or a supporting wire mesh. If there is no proton exchange membrane, then treated wastewater 81 created in the anode layer is immediately diluted.

The passage of protons into the anode chamber creates a proton gradient, and by connecting the cathode layer 51 and anode layer 53 with the set of wires 55, electrons flow from the anode to the cathode as they move through a circuit. This flow of electrons creates an electrical current that can be used to charge the battery 13.

Figure 6:
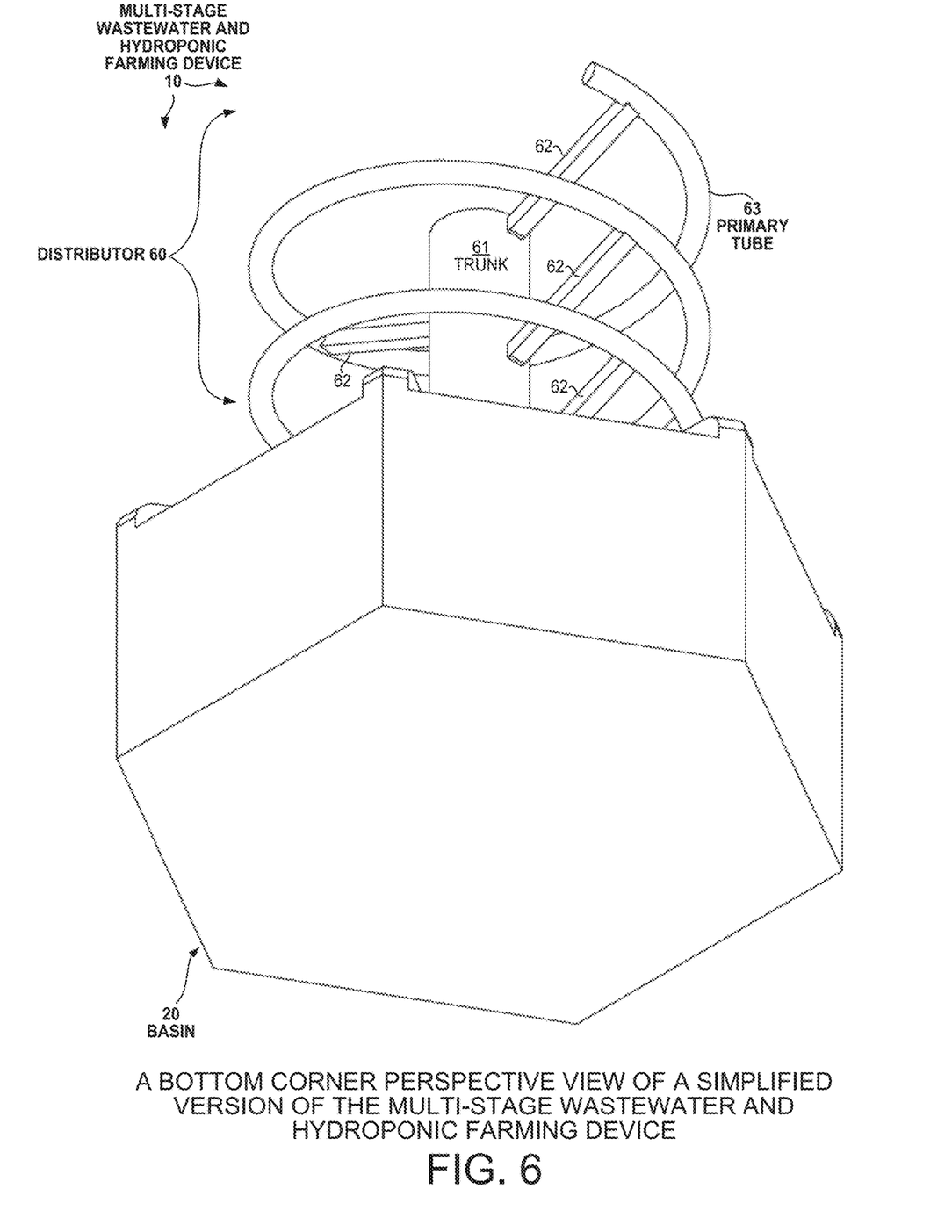
FIG. 6 is a diagram showing a bottom corner perspective view of a simplified version of the Multi-Stage Wastewater Treatment and Hydroponic Farming Device.

FIG. 6 is a diagram showing a bottom corner perspective view of a simplified version of the Multi-Stage Wastewater Treatment and Hydroponic Farming Device 10. The Multi-Stage Wastewater Treatment and Hydroponic Farming Device 10 in FIG. 6 includes the basin 20, the distributor 60, and the primary tube 63. The distributor 60 shown includes the trunk 61 and the plurality of supports 62. The supports 62 support the primary tube 63.

Figure 7:
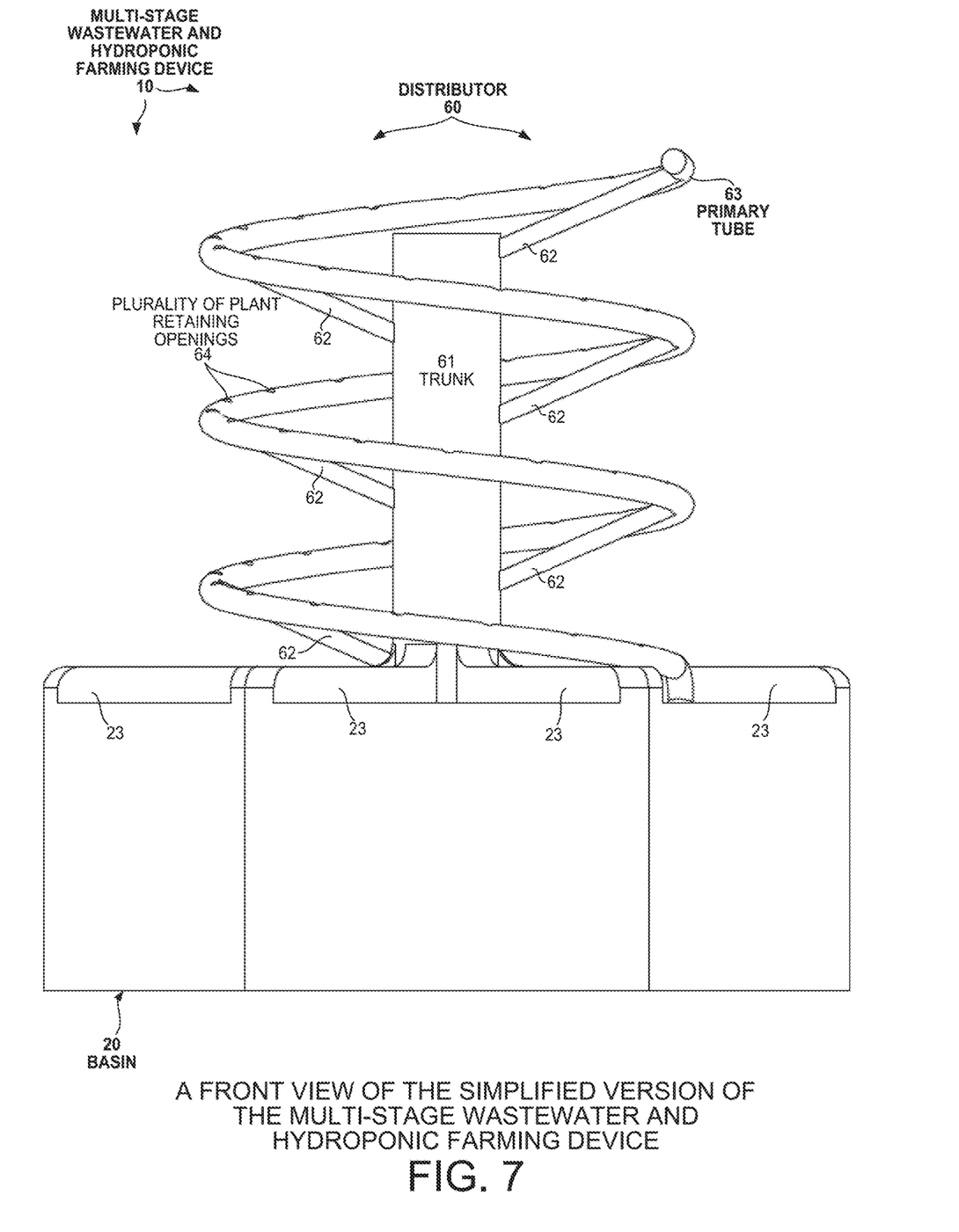
FIG. 7 is a diagram showing a front view of a simplified version of the Multi-Stage Wastewater Treatment and Hydroponic Farming Device.

FIG. 7 is a diagram that shows a front view of a simplified version of the Multi-Stage Wastewater Treatment and Hydroponic Farming Device 10. The Multi-Stage Wastewater Treatment and Hydroponic Farming Device 10 in FIG. 7 includes the basin 20, the distributor 60, and the primary tube 63 having the plurality of plant retaining openings 64. The distributor 60 shown includes the trunk 61 and the plurality of supports 62, that support the primary tube 63. The basin 20 shown includes the plurality of supports 23. The supports 23 support the trunk 61 of the distributor 60.

Figure 8:
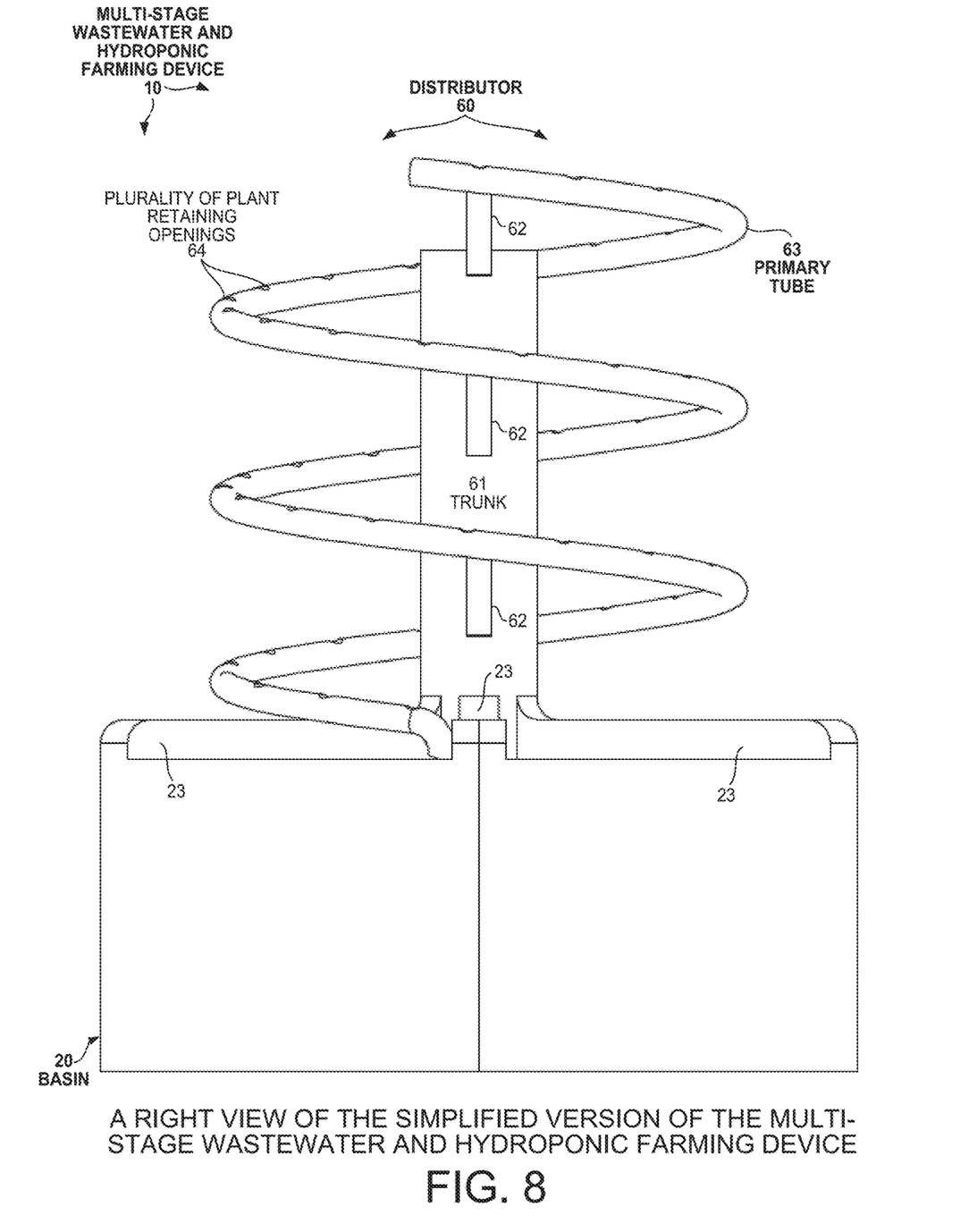
FIG. 8 is a diagram showing right view of a simplified version of the Multi-Stage Wastewater Treatment and Hydroponic Farming Device.

FIG. 8 is a diagram that shows a right view of a simplified version of the Multi-Stage Wastewater Treatment and Hydroponic Farming Device 10. The Multi-Stage Wastewater Treatment and Hydroponic Farming Device 10 in FIG. 8 includes the basin 20, the distributor 60, and the primary tube 63 having the plurality of plant retaining openings 64. The distributor 60 shown includes the trunk 61 and the plurality of supports 62, that support the primary tube 63. The basin 20 shown includes the plurality of supports 23. The supports 23 support the trunk 61 of the distributor 60.

Figure 9:
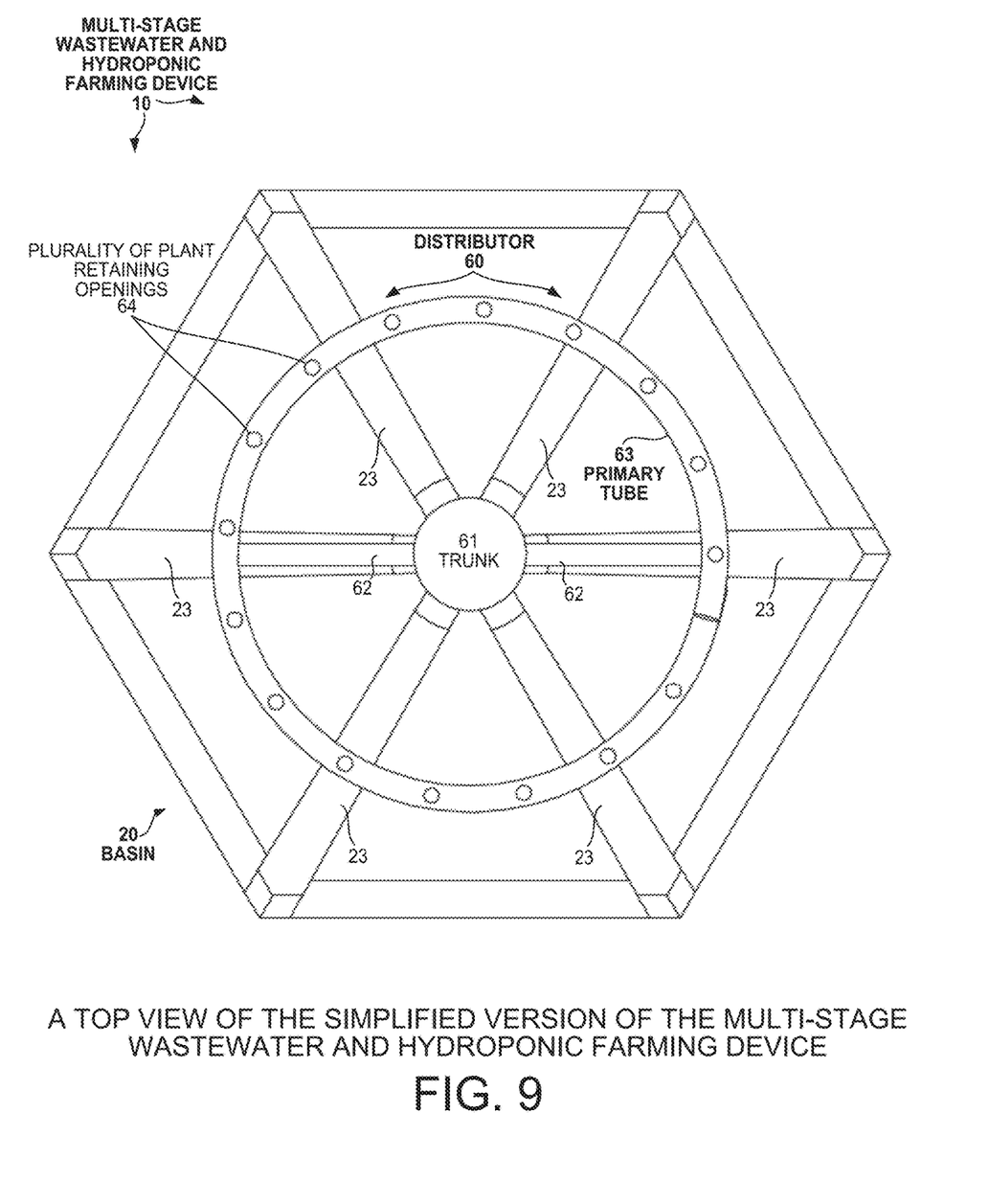
FIG. 9 is a diagram showing a top view of a simplified version of the Multi-Stage Wastewater Treatment and Hydroponic Farming Device.

FIG. 9 is a diagram that shows a top view of a simplified version of the Multi-Stage Wastewater Treatment and Hydroponic Farming Device 10. The Multi-Stage Wastewater Treatment and Hydroponic Farming Device 10 in FIG. 9 includes the basin 20, the distributor 60, and the primary tube 63 having the plurality of plant retaining openings 64. The distributor 60 shown includes the trunk 61 and the plurality of supports 62, that support the primary tube 63. The basin 20 shown includes the plurality of supports 23. The supports 23 support the trunk 61 of the distributor 60.

Figure 10:
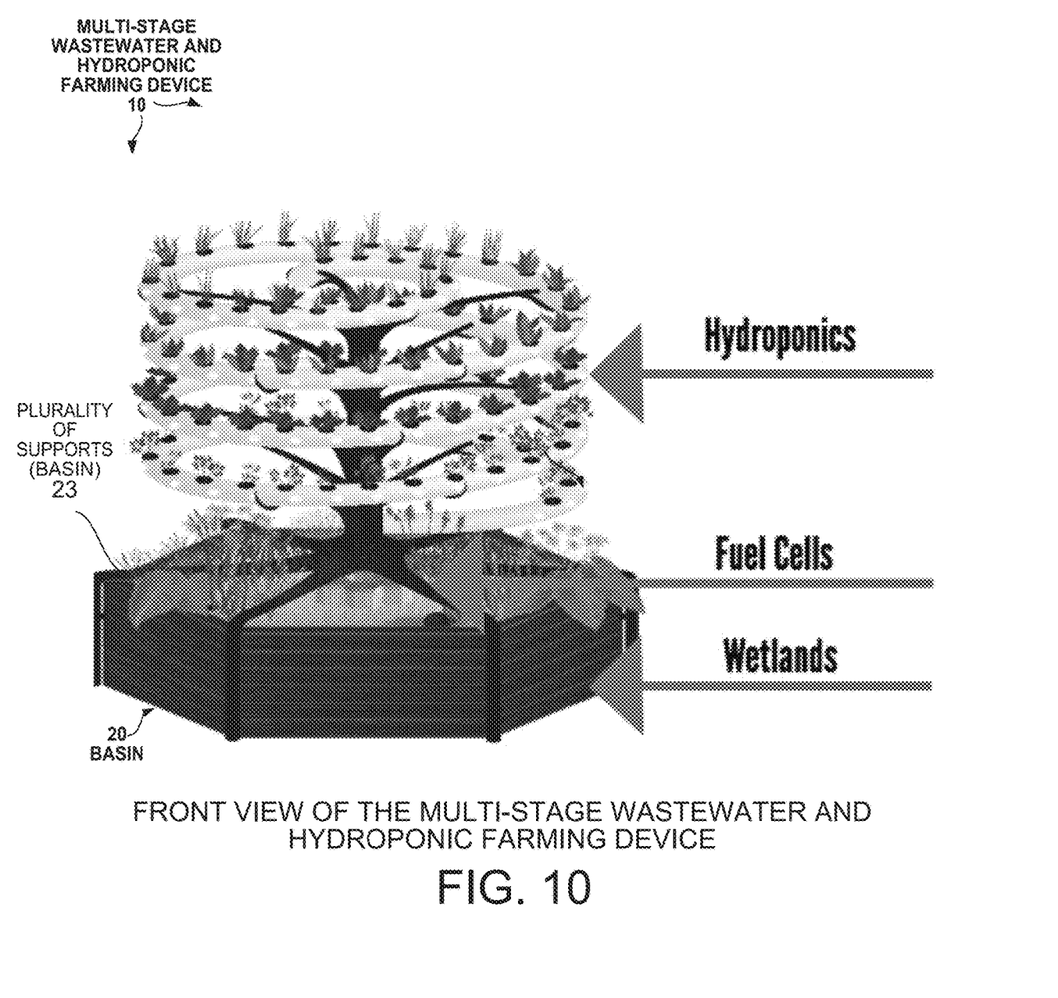
FIG. 10 is a front view of the Multi-Stage Wastewater Treatment and Hydroponic Farming Device.

FIG. 10 is a diagram that shows a front view of the Multi-Stage Wastewater Treatment and Hydroponic Farming Device 10. FIG. 10 illustrates the Multi-Stage Wastewater Treatment and Hydroponic Farming Device 10 including hydroponics as a type of plant 70 that can be disposed in the plurality of plant retaining holes 64 the primary tube 63. (see FIG. 1). Also shown are multiple fuel cells (at least one MFC 50) that are located within the basin 20. FIG. 10 also indicates wetlands (modified wetland material 40) that are disposed in an area of the basin 20. Additionally, FIG. 10 shows the plurality of supports 23 extending over the outer perimeter of the basin 20.

Figure 11:
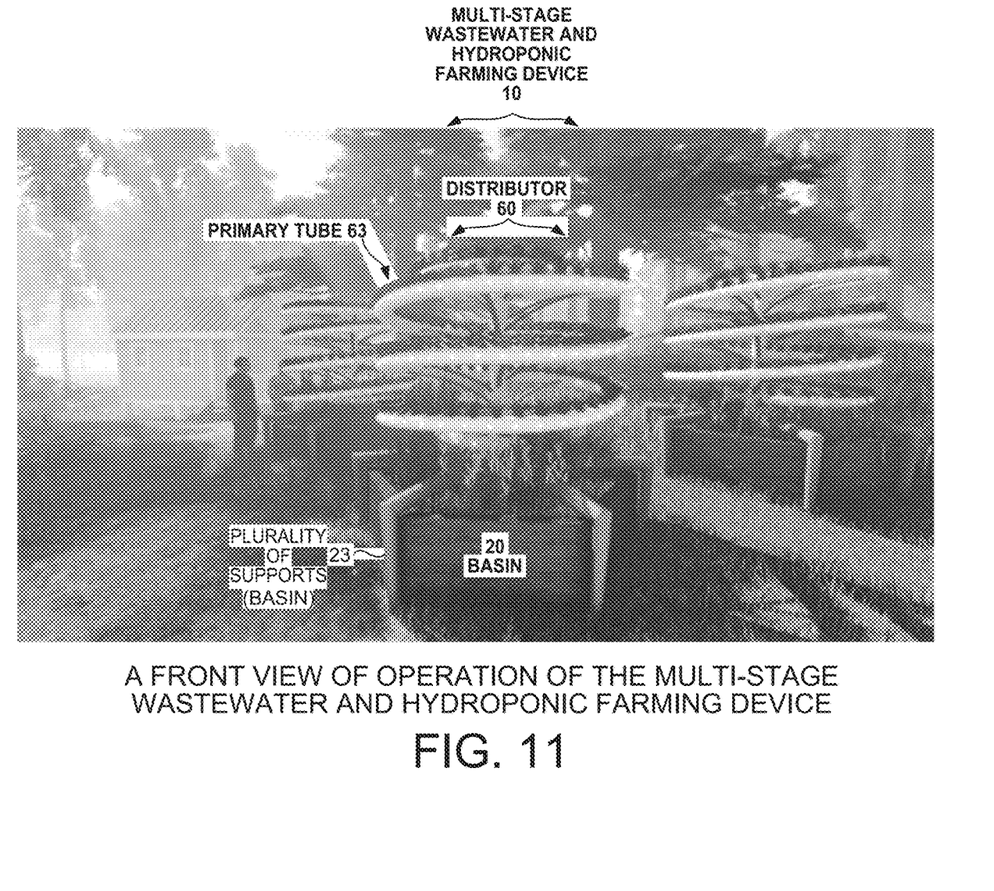
FIG. 11 is a front view of operation of the Multi-Stage Wastewater Treatment and Hydroponic Farming Device.

FIG. 11 is a diagram that shows a front view of the Multi-Stage Wastewater Treatment and Hydroponic Farming Device 10 in operation. In the example of FIG. 11, the Multi-Stage Wastewater Treatment and Hydroponic Farming Device 10 is deployed in an outdoor setting. The Multi-Stage Wastewater Treatment and Hydroponic Farming Device 10 is designed such that it primarily shows plants, wetland plants, and a wooden basin, which provides a more natural look and consistent with an outdoor environment. The wastewater treatment device in FIG. 10 also includes a plurality of supports 23 that extend beyond the outer perimeter of the basin 20. Each of the plurality of supports 23 comprises a PVC or plastic type material that is connected to the bottom end of the primary tube 63 of the distributor 60 which allows resultant water 82 to flow into the ground surrounding the basin 20.

Figure 12:
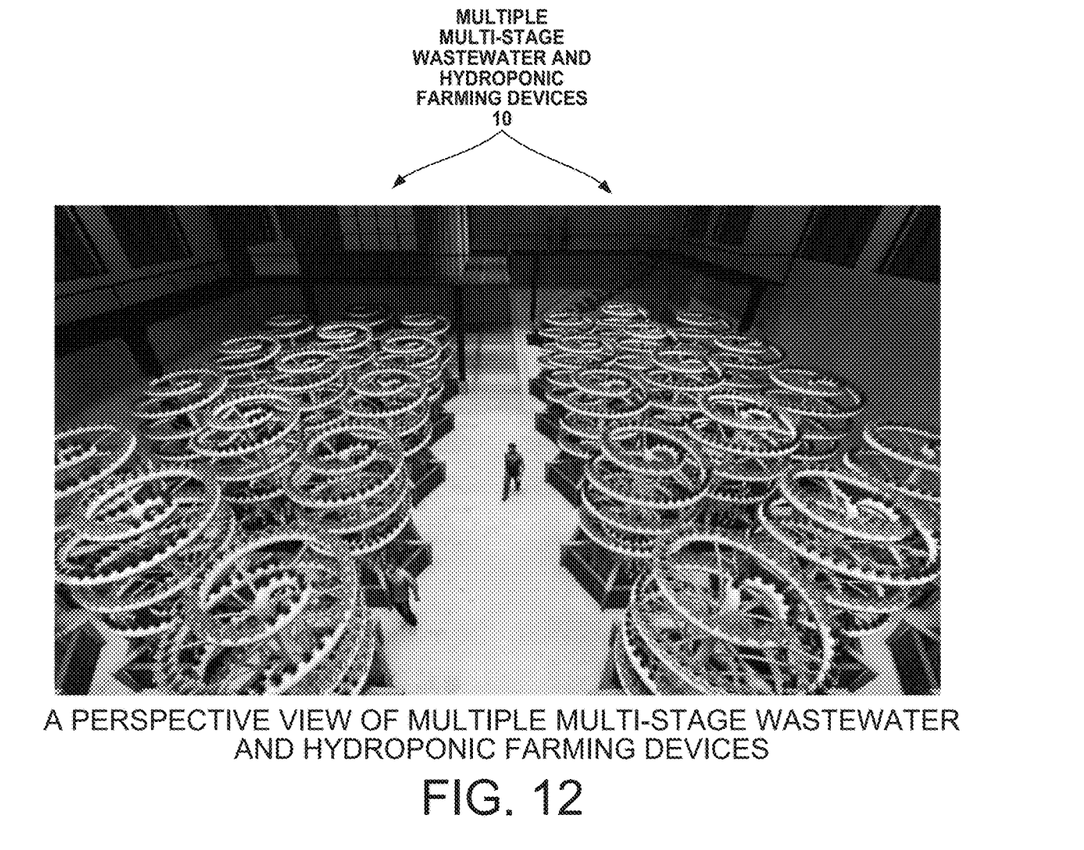
FIG. 12 is a perspective view of multiple Multi-Stage Wastewater Treatment and Hydroponic Farming Devices.

FIG. 12 shows a perspective of a preferred usage of multiple Multi-Stage Wastewater Treatment and Hydroponic Farming Devices. In this example, FIG. 12 illustrates multiple wastewater treatment devices 10 for use in an indoor setting. The compact nature of the Multi-Stage Wastewater Treatment and Hydroponic Farming Device 10 allows for storage of multiple wastewater treatment devices 10 where each one only requires a relatively small surface area in which to operate. This example also shows that multiple wastewater treatment devices 10 can operate together and simultaneously.

Figure 13:
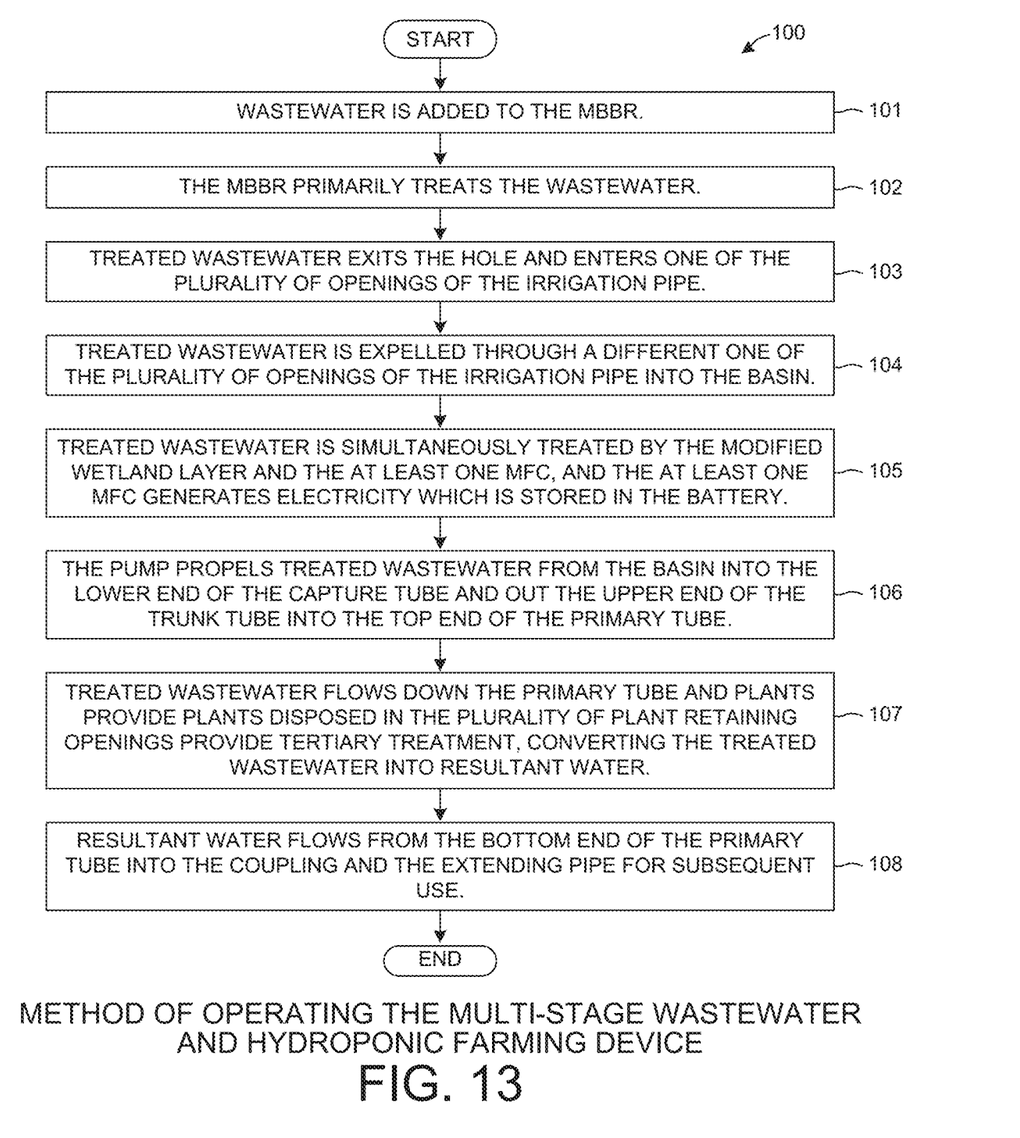
FIG. 13 is a flowchart showing a method of operating the Multi-Stage Wastewater Treatment and Hydroponic Farming Device.

FIG. 13 is a flowchart of a method 100 of operating the Multi-Stage Wastewater Treatment and Hydroponic Farming Device 10. In a first step (step 101), wastewater 80 is added to the MBBR 30.

In a second step (step 102), the MBBR 30 primarily treats the wastewater 80.

In a third step (step 103), the treated wastewater 81 exits the hole 33 and enters one of the plurality of openings of the irrigation pipe 12.

In a fourth step (step 104), treated wastewater 81 is expelled through a different one of the plurality of openings of the irrigation pipe 12 into the basin 20.

In a fifth step (step 105), treated wastewater 81 is simultaneously treated by the modified wetland layer 40 and the at least one MFC 50, and the at least one MFC 50 generates electricity which is stored in the battery 13.

In a sixth step (step 106), the pump 65 propels treated wastewater 81 from the basin 20 into the lower end of capture tube 66 and out the upper end of the trunk tube 67 into the top end of the primary tube 63.

In a seventh step (step 107), treated wastewater 81 flows down the primary tube 63 and plants 70 disposed in the plurality of plant retaining openings 64 provide tertiary treatment, converting the treated wastewater 81 into resultant water 82.

In an eighth step (step 108), the resultant water 82 flows from the bottom end of the primary tube 63 into the coupling 14 and the extending pipe 15 for subsequent use.

Although certain specific embodiments are described above for instructional purposes, the teachings of this patent document have general applicability and are not limited to the specific embodiments described above. For example, other forms of renewable energy (e.g.—solar panels) can be placed near the basin 20 to provide power to the Multi-Stage Wastewater Treatment and Hydroponic Farming Device 10. In yet another example, additional pumps are used to further circulate the treated wastewater 81 in the basin 20. In yet another example, the distributor 60 includes plurality of supports 23 rather than the basin 20. In yet another example, neither the basin 20 nor distributor 60 include the plurality of supports 23.

Accordingly, various modifications, adaptations, and combinations of various features of the described embodiments can be practiced without departing from the scope of the invention as set forth in the claims.

What is claimed is:

1. A multi-stage wastewater treatment and hydroponic farming device comprising:
   a basin, wherein the basin has a water containment interior surface; and
   a distributor having an upper end and a lower end, wherein the distributor comprises a trunk, a primary tube, a plurality of supports that supports the primary tube, a plurality of secondary tubes, a pump, wherein the trunk comprises an upper end and a lower end, wherein the primary tube comprises a top end, a bottom end, and a plurality of plant retaining openings, and wherein the trunk of the distributor is disposed within the basin.

2. The multi-stage wastewater treatment and hydroponic farming device of claim 1, wherein an inlet tube is a hollow connector that enables a user to continuously add wastewater to the basin.

3. The multi-stage wastewater treatment and hydroponic farming device of claim 1, wherein the basin comprises modular sections that form a container that enables capture and containment of wastewater, treated wastewater, and resultant water.

4. The multi-stage wastewater treatment and hydroponic farming device of claim 1, wherein the basin includes a plurality of supports that supports the distributor.

5. The multi-stage wastewater treatment and hydroponic farming device of claim 1, wherein the wastewater treatment device includes an irrigation pipe having a plurality of openings, and wherein the irrigation pipe is disposed within the basin.

6. The multi-stage wastewater treatment and hydroponic farming device of claim 1, wherein one of the plurality of secondary tubes is a trunk tube that connects to the pump and extends into the top end of the primary tube, and wherein one of the plurality of secondary tubes is a capture tube that connects to the pump and extends below the level of the wastewater.

7. The multi-stage wastewater treatment and hydroponic farming device of claim 1, wherein the trunk of the distributor is hollow and contains at least one of the plurality secondary tubes that enables the transfer of wastewater from the basin to the top end of the primary tube.

8. The multi-stage wastewater treatment and hydroponic farming device of claim 1, wherein the primary tube forms a helical shape around the trunk of the distributor.

9. The multi-stage wastewater treatment and hydroponic farming device of claim 1, wherein a plant is disposed in each of the plurality of plant retaining holes in the primary tube, and wherein the plant provides tertiary treatment of the wastewater.

10. The multi-stage wastewater treatment and hydroponic farming device of claim 1, wherein the MBBR includes an air pump and air tube, wherein the MBBR is enclosed by paneling and a plurality of carriers, and wherein the MBBR provides primary treatment of the wastewater.

11. The multi-stage wastewater treatment and hydroponic farming device in claim 10, wherein one of the sections of the paneling of the MBBR contains a hole that connects to one of the plurality of openings of the irrigation pipe.

12. The multi-stage wastewater treatment and hydroponic farming device of claim 1, wherein the modified wetland material comprises a filter bed and a plurality of wetland plants, and wherein the plurality of wetland plants provides primary, secondary, and tertiary treatment of the wastewater.

13. The multi-stage wastewater treatment and hydroponic farming device of claim 1, wherein the at least one microbial fuel cell includes a container and a plurality of layers, wherein the plurality of layers is a set of various metals, plastics, and ceramics, wherein the plurality of layers comprises a cathode layer, a proton exchange membrane, and an anode layer, wherein the cathode and anode layers contain electrodes, and wherein the proton exchange membrane separates the cathode layer from the anode layer, and wherein the at least one microbial fuel cell provides tertiary treatment of the wastewater.

14. The multi-stage wastewater treatment and hydroponic farming device of claim 1, wherein the wastewater treatment device includes an extension pipe, wherein the extension pipe is attached to the bottom end of the primary tube using a coupling.

15. A multi-stage wastewater treatment and hydroponic farming device comprising:
   a basin, wherein the basin has a water containment interior surface; and
   a distributor having an upper end and a lower end, wherein the distributor comprises a trunk, a primary tube, a plurality of supports that supports the primary tube, a plurality of secondary tubes, a pump, wherein the trunk comprises an upper end and a lower end, wherein the primary tube comprises a top end, a bottom end, and a plurality of plant retaining openings, wherein the trunk of the distributor is disposed within the basin, wherein the basin contains a moving bed biofilm reactor (MBBR), a modified wetland material, and at least one microbial fuel cell (MFC), and wherein the MBBR, the modified wetland material, and at least one MFC are disposed within the basin.

16. A method of operating a multi-stage wastewater treatment and hydroponic farming device comprising:
   adding wastewater to be cleaned to a basin having a moving bed biofilm reactor (MBBR);
   treating the wastewater within the MBBR;
   transporting the treated wastewater from the MBBR to a center of the basin, a modified wetland material, and at least one microbial fuel cell;
   treating the treated wastewater using the modified wetland material and the at least one microbial fuel cell;
   transporting the treated wastewater from the modified wetland material and the at least one microbial fuel cell to the center of the basin;
   pumping the treated wastewater from the basin Rtheflto a top end of a primary tube of a distributor using a pump and a plurality of secondary tubes;
   distributing the treated wastewater to plants disposed in a plurality of plant retaining openings in the primary tube of the distributor;
   converting the treated wastewater to resultant water using the plants; and
   transferring resultant water to the MBBR.

17. The method of operating a multi-stage wastewater treatment and hydroponic farming device of claim 16, wherein the at least one microbial fuel cell generates electricity that is stored in a battery.

18. The method of operating a multi-stage wastewater treatment and hydroponic farming device of claim 16, wherein the treated wastewater is transported from the MBBR to the modified wetland material, wherein the treated wastewater is transported from the modified wetland material to the at least one microbial fuel cell, and wherein, the treated wastewater is transported from the at least one microbial fuel cell to the center of the basin.

* * * * *